Dec. 22, 1953  J. AMBLARD  2,663,856
ELECTRIC INDICATING DEVICE
Filed Jan. 15, 1952

Inventor:
JOSEPH AMBLARD,
By
Freeman & Marmaouk,
His Agents.

Patented Dec. 22, 1953

2,663,856

UNITED STATES PATENT OFFICE 2,663,856

ELECTRIC INDICATING DEVICE

Joseph Amblard, Paris, France

Application January 15, 1952, Serial No. 266,517

Claims priority, application France
January 24, 1951

7 Claims. (Cl. 340—201)

The present invention relates to electric indicators, in particular distance electric indicators comprising a transmitter recording (in the form of an average electric resistance) a condition, a phenomenon, etc., in series with a source of current supply, and a receiver sensitive to the current controlled by the transmitter in question, said transmitter being of the type consisting of a heating resistance surrounding a bi-metallic contact strip with which it is in series.

This type of transmitter operates as a vibrator controlling the current sent into the receiver, which can be a galvanometer, a sonorous signal, etc. The phenomenon or condition to be indicated acts on the bi-metallic strip by a force which changes its freedom of movement, this force resulting in variations of the average current controlled by the vibrator and actuating the receiver.

In the known devices, this force is exercised by mechanical means acting directly or indirectly on the bi-metallic strip, according to the phenomenon or condition to be recorded, and this gives rise to a certain lack of flexibility and precision in the system.

The present invention permits of obviating the above-mentioned drawback and is particularly characterized by the fact that the force exercised on the bi-metallic strip is produced by a magnetic field which is variable according to the evolution of the phenomenon, change of condition, etc., to be recorded.

In a preferred embodiment of the transmitter of the indicating device, the transmitter is further particularly characterized by the following features, taken separately or combined with each other:

The bi-metallic strip carries a component made of magnetic material and placed in the variable magnetic field;

The variable magnetic field is produced by a mobile magnet which changes its position according to the phenomenon, condition, etc., to be recorded;

Displacement of the magnet takes place crosswise in relation to the vibrations of the bi-metallic strip;

Displacement of the magnet is controlled by a lever subjected to the phenomenon or condition to be recorded;

A fixed armature is placed substantially as a prolongation of the component of magnetic material carried by the bi-metallic strip, the purpose of said armature being to conserve the force of the magnet when the latter is displaced beyond its zone of action on the component in question made of magnetic material.

Other characteristics and particular features of an electric indicator device improved according to the invention are shown by the description hereunder, which relates to a few specimen embodiments and uses of the said device, given solely by way of an indication, and represented diagrammatically in the attached drawing, in which.

Figure 6:
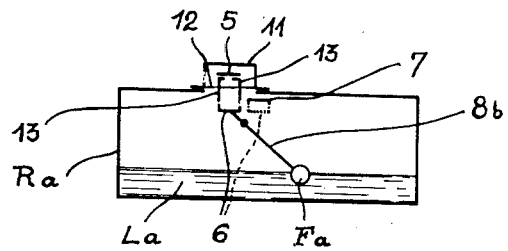

Fig. 6, finally, shows the use of the device for ascertaining the level of an inflammable liquid (in a gasolene tank, for instance).

Figure 1:
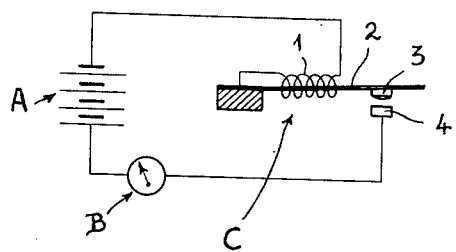
Fig. 1 is a general diagram showing the circuit of the indicating device.

Fig. 1 shows the electric circuit of the device. This circuit comprises a source of current supply A, a suitably calibrated galvanometer B and a transmitter C, comprising a heating winding 1 surrounding a bi-metallic strip 2 in series with the said winding and carrying a contact 3 which works with a fixed contact 4.

Figures 2, 3:
Figs. 2 and 3 show the magnet which regulates the force applied to the bi-metallic strip, in two different positions.

According to the invention, the free end of the bi-metallic strip 2 carries (see Figs. 2 and 3) a soft iron tongue 5 which can be subjected to the action of a magnet 6, able to move in the directions of the arrows $f^1$ (Fig. 2) and $f^2$ (Fig. 3). A fixed armature 7, placed substantially in the plane of the tongue 5, prevents demagnetization of the magnet 6 when the latter moves out of the zone (Fig. 3) in which it applies the maximum force to the above-mentioned tongue.

It is easily seen that when the magnet 6 is in the position shown on Fig. 2, the bi-metallic strip is subjected to the maximum force, so that the contacts 3 and 4 open for short periods, that is to say, a maximum average current passes through the receiver B; in the position shown in Fig. 3, on the contrary, the bi-metallic strip has its maximum freedom of movement, so that the contacts 3 and 4 close for short periods, that is to say, a minimum average current passes through the said receiver.

It therefore suffices to cause the phenomenon of condition to be recorded to act on the position of the magnet 6, and the receiver B will indicate the said phenomenon or condition.

Figures 4, 5:
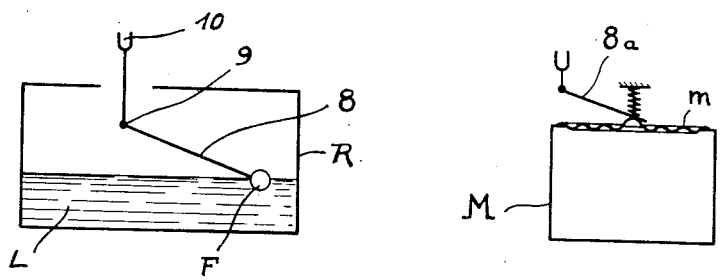
Figs. 4 and 5 show the means actuating the regulating magnet when the device is used to record the level of a liquid and a pressure, respectively.

In the specimen embodiment shown in Fig. 4, for recording the fixed or variable level of a liquid L contained in a receptacle R, there is a float F fitted to one end of a bell crank lever 8, pivoting at 9 and provided, at its other end, with a fork 10 which catches the sliding magnet and displaces it according to the level of the liquid.

Fig. 5 shows the use of the device for recording pressure in a manometric capsule M, the deformable wall m of which (subject to the action of a spiral spring) actuates the free end of the bell crank lever 8a, which fills the same function as the lever 8 in the preceding example.

In an alternative embodiment, as in Fig. 6, the indicating device is shown for use to indicate the level of an inflammable liquid La contained in a tank Ra, the vibrating member (bi-metallic strip), which gives off sparks, being enclosed in a casing 11 insulated from the tank in question by a partition 12, made of non-magnetic material.

In this case, the tongue 5 works in conjunction with the upper ends of two pole-pieces 13, which pass through the partition 12 and whose lower ends, in the tank Ra, work in conjunction with the mobile magnet 6 which, when it is furthest away from the said pole-pieces, is opposite the fixed armature 7, also placed in the tank Ra and designed to prevent demagnetization of the magnet 6 which is actuated by the lever 8b fitted with a float Fa.

It goes without saying that the specimen embodiments and uses of the electric indicating device, described above and shown in the attached drawing, have been given solely by way of indication and are not in any way restrictive, and that any changes of detail can be made therein without thus entailing a departure from the spirit of the invention.

What I claim is:

1. In a transmitter of an electric indicating device designed to record a phenomenon and comprising, connected together to form a closed circuit, a source of electric current, a receiver sensitive to the average intensity of the current, and the above mentioned transmitter for controlling the current as a function of the phenomenon to be recorded, said transmitter comprising: a stationary contact member; a bi-metallic strip one end of which is capable of vibrating and provided with a contact member for operating with the stationary contact member; and a resistance adapted to heat the bi-metallic strip and of which one end is connected to said strip, the other end of said resistance and the stationary contact being connected in series in the said circuit; the provision of an element made of magnetic material integral with the vibrating end of said bi-metallic strip and means for producing, on the said element, a magnetic force which is variable according to the phenomenon to be recorded, so that the freedom of vibrating of the strip depends on said phenomenon and that the average intensity of the current passing the two contact members also depends on said phenomenon.

2. A transmitter as claimed in claim 1, wherein the means for producing the magnetic force consist in a movable magnet adapted to be displaced with respect to the element of magnetic material, according to the phenomenon to be indicated.

3. A transmitter as claimed in claim 1, further comprising a lever operatively connected to the means for producing the magnetic force for displacing the said means.

4. A transmitter as claimed in claim 1, further comprising, between the element made of magnetic material integral with the vibrating strip and the means for producing the magnetic force, at least one pole-piece allowing the remoteness of said means from the said strip.

5. A transmitter as claimed in claim 4, wherein the pole-piece passes through a partition which keeps apart from each other, the means producing the magnetic force and the vibrating strip, for allowing the location of the contact members in a space distinct from the space where the said means are moving.

6. A transmitter as claimed in claim 2, wherein the magnet is movable crosswise in relation to the vibrating movements of the bi-metallic strip.

7. A transmitter as claimed in claim 2, further comprising, near the path of the movable magnet, a fixed armature for the conservation of the magnetic force of the magnet when the latter moves outside the position in which it exerts its maximum force on the element made of magnetic material.

JOSEPH AMBLARD.

References Cited in the file of this patent

UNITED STATES PATENTS

| Number | Name | Date |
|---|---|---|
| 2,371,511 | Faus | Mar. 13, 1945 |
| 2,520,899 | Smulski | Aug. 29, 1950 |